(12) United States Patent
Louchart, III

(10) Patent No.: US 6,267,084 B1
(45) Date of Patent: Jul. 31, 2001

(54) APPARATUS FOR CURING RETREAD TIRE ASSEMBLIES

(75) Inventor: Theophile Henry Louchart, III, Roebuck, SC (US)

(73) Assignee: Michelin Recherche et Technique S.A. (CH)

(*) Notice: Subject to any disclaimer, the term of this patent is extended or adjusted under 35 U.S.C. 154(b) by 0 days.

(21) Appl. No.: 09/561,714

(22) Filed: May 1, 2000

(51) Int. Cl.[7] ........................................ B09B 3/00
(52) U.S. Cl. ........................ 122/4 D; 425/28.1; 425/29; 156/96
(58) Field of Search ................... 122/4 D, 7 R, 122/414; 425/28.1, 29; 156/96, 42.2, 421.6, 406.4

(56) References Cited

U.S. PATENT DOCUMENTS

| | | | |
|---|---|---|---|
| 3,999,907 | * 12/1976 | Pappas | 425/28.1 |
| 4,572,082 | * 2/1986 | Ueda et al. | 122/4 D |
| 4,861,253 | * 8/1989 | Mattson | 425/29 |
| 5,932,153 | * 8/1999 | Keys | 156/96 |

* cited by examiner

Primary Examiner—Gregory Wilson
(74) Attorney, Agent, or Firm—Martin Farrell

(57) ABSTRACT

An apparatus for curing retread tire assemblies includes an autoclave in which retread assemblies are placed and a heated water system for heating the autoclave. The heated water system provides heated water under pressure to the autoclave to achieve heat transfer at a rate and capacity sufficient for curing the retread assemblies. A control valve controls the flow of heated water according the heating demand of the autoclave. The system is adaptable for use in curing presses for retread assemblies.

15 Claims, 2 Drawing Sheets

APPARATUS FOR CURING RETREAD TIRE ASSEMBLIES

BACKGROUND AND SUMMARY

The invention relates to tire retreading, and more particularly to an apparatus for curing a retread tire assembly comprising a tire carcass, new tread rubber, and bonding layer.

In tire retreading operations, the worn tread is stripped or buffed from the crown of the tire carcass and new tread rubber is bonded in place. In one type of operation, the new tread rubber is in a cured state when placed on the carcass and a bonding layer of, for example, gum rubber is placed between the crown of the carcass and the cured tread strip. The bonding layer is cured to secure the tread to the carcass. One curing apparatus, an autoclave, requires placing the retread tire assembly in an envelope which is then evacuated. The assembly and envelope are placed in an autoclave for heat and pressure treatment to cure the bonding layer.

In another type of operation, the tread rubber is in uncured state and is applied to the carcass crown and cured in place. The assembly of carcass and uncured tread rubber is placed in a curing press having a bladder that fits within the interior cavity of the tire assembly and heating means to heat the bladder and the area surrounding the tire tread.

An autoclave is a large pressure and temperature controlled vessel having a capacity for several tire assemblies. One model autoclave for curing 25 tire assemblies has an interior volume of 905 cubic feet. Typically, to heat the air in an autoclave, heated steam or oil is forced through a heat exchanger in the autoclave, or electrical resistance elements in the autoclave are used. Each of these has deficiencies.

Steam requires a steam boiler and associated piping and control elements that are expensive to install and maintain. A heated oil system is also expensive to install and maintain, and requires special care to prevent fire hazards. Both steam and heated oil depend on heat transfer to heat the air in the autoclave. Electrical resistance heats the air directly, but is expensive to operate.

There is a need for an apparatus that eliminates the drawbacks in the conventional devices.

The present invention provides an apparatus for curing a retread tire assembly that uses heated, pressurized water as the heating medium for a curing chamber. An apparatus in accordance with the invention is less expensive to install and maintain than either steam or oil systems. The apparatus is less expensive to operate than electrical resistance heating elements.

It had been thought by those skilled in the art that water lacked the heat transfer capacity to sufficiently heat the air in an autoclave chamber to the required temperature for curing the assemblies inside. The inventor has unexpectedly found that heated and pressurized water could operate in a circuit such as a tube and fin heat exchanger to attain and maintain a curing temperature in the autoclave. The invention defines flow rates for the water in the heating system that help achieve this unexpected result.

According to the invention, the apparatus includes an autoclave having an interior space in which retread tire assemblies may be placed for curing. The autoclave has a heat exchanger in the interior space. An electrical or gas powered vessel to heat water is connected in a closed circuit to the heat exchanger. The air in the autoclave is circulated by a fan to ensure uniformity of the air temperature throughout the chamber and to facilitate heat transfer from the heat exchanger.

According to a preferred embodiment of the invention, the vessel has the capacity to heat water to at least 290° F. (143° C.). The vessel preferably has a volumetric capacity of approximately 20 gallons of water.

A pump, preferably a centrifugal pump, is disposed in the closed circuit to pump heated water between the vessel and the heat exchanger under pressure. According to the invention, the pump provides a flow rate of 20 to 50 gallons per minute, and preferably about 25 to 35 gallons per minute.

According to the invention, a control valve maintains a flow of heated water at a constant rate to the autoclave to meet heating demand. A temperature sensor senses the temperature in the autoclave, measuring the air temperature or the temperature at the retread tire assembly, and provides feedback to the control valve for controlling the flow of heated water.

Advantageously, the invention uses the same heat exchanger and control valve as a steam heating system, which minimizes the cost of modifying an existing system to incorporate the invention.

According to an alternative embodiment, the water system is connected to a curing press for curing a retread tire assembly with an uncured tread rubber strip.

BRIEF DESCRIPTION OF THE DRAWINGS

The invention will be better understood through the following detailed description read in conjunction with the appended drawings, in which.

DETAILED DESCRIPTION OF THE INVENTION

Figure 1:
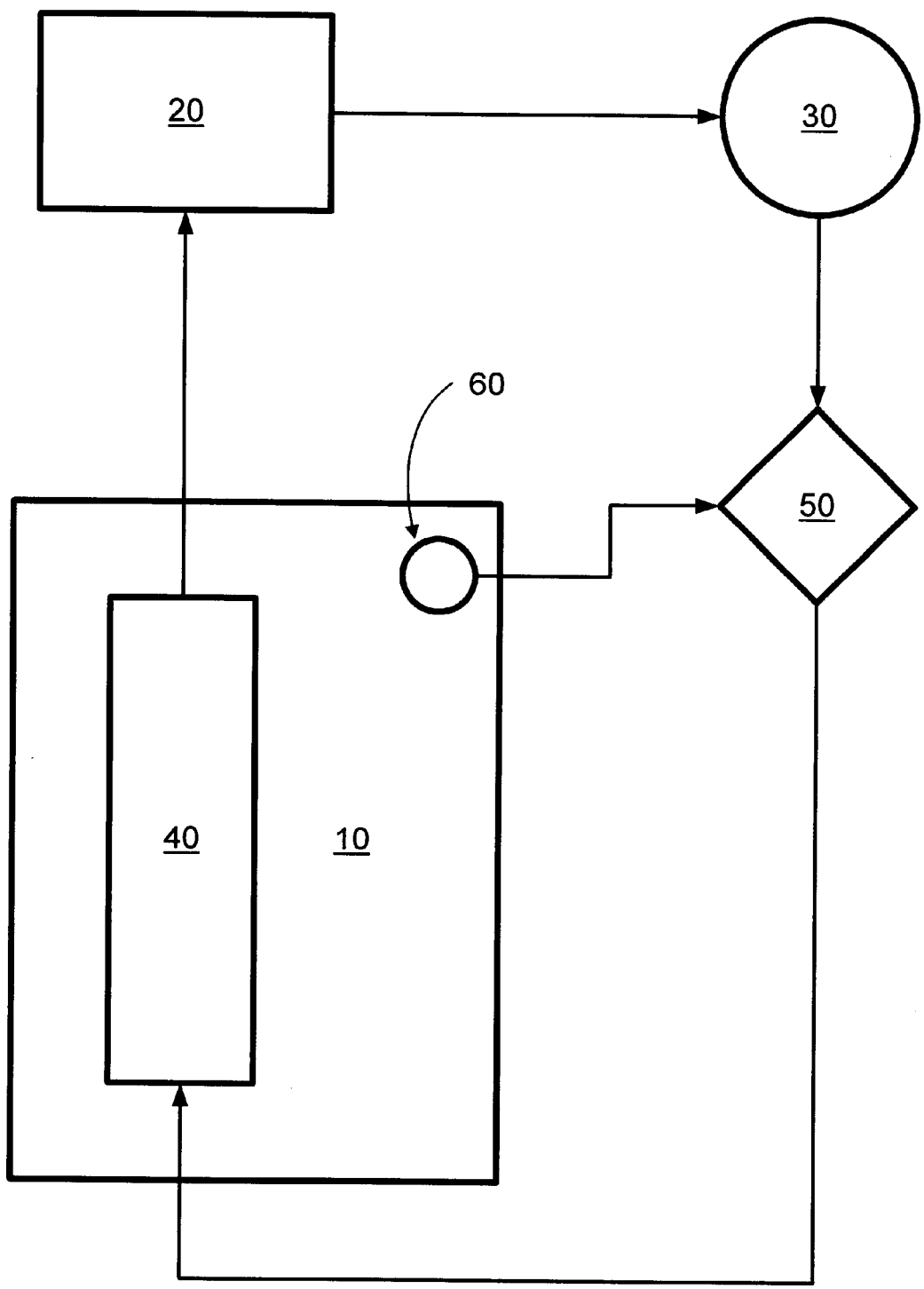
FIG. 1 is a schematic representation of an apparatus in accordance with a preferred embodiment of the invention.

FIG. 1 shows a schematic representation of an apparatus in accordance with the invention including a tire curing chamber 10, a water heating system 20 and a pump 30.

According to a preferred embodiment of the invention, the tire curing chamber is an autoclave 10, a large volume heat and pressure controlled chamber for curing a plurality of retread tire assemblies. A heat exchanger 40 is disposed in the autoclave 10 to transfer heat to the air in the chamber. As an example, an autoclave and heat exchanger as described in the illustrative embodiment are available from Cure Tech Inc. of Conyers, Ga. In an operation to cure a precured tread to a carcass, the bonding rubber layer is heated to about 108° C. To obtain this temperature at the bonding rubber layer, the air in the chamber is heated to about 135° C. to about 145° C. and preferably to about 137° C. The heat exchanger may be any suitable unit, and is preferably a tube and fin multi-pass type heat exchanger or a steam-plate type heat exchanger.

The invention advantageously uses a heat exchanger sized for steam heat in a conventional autoclave, which does not require modifying the interior of the autoclave to use the invention. The inventor found that using conventional methods of sizing a heat exchanger for the autoclave requirements using hot water as the heat transfer medium would require a heat exchanger about 5 to 7 times larger than the steam unit in a conventional autoclave. Such a heat exchanger would have taken far too much space in the autoclave to be practical. By changing the flow characteristics of heated water through the heat exchanger, rather than the size of the heat exchanger, the inventor found unexpectedly that heat transfer meeting the demand in the autoclave could be accomplished with heated water in a closed system.

The water heating system 20 in accordance with the invention provides heated water to the heat exchanger 40 for the required heat transfer. The water heater 20 and heat exchanger 40 are connected in a closed system for circulating heated water between the water heater to the heat exchanger. The pump 30 circulates the heated water under pressure. A control valve 50 controls the flow rate and pressure of the heated water.

According to the invention, using a $\Delta°T$ of about 17° C. (30° F.) from the heat exchanger to the autoclave air, the water heater 20 heats water to a temperature in a range of 143° C. (290° F.) to about 177° C. (350° F.), and preferably about 143° C. to about 160° C. (320° F.). More preferably, the range is about 155° C. (312° F.) to about 157° C. (315° F.). This water temperature heats the air in the autoclave to a curing temperature of 125° C. to 160° C.

The heated water in the closed system will reach a pressure of approximately 70 to 90 psi, and preferably about 80–85 psi. The flow rate of the heated water depends on the heat demand of the autoclave, and is in a range of 20 to 50 gallons per minute and preferably about 25 to 35 gallons per minute.

With this water temperature and flow rate, the air in the autoclave will reach about 125° C. to about 160° C., which is desired for heating the tire assemblies to reach a cure temperature in the bonding layer.

The internal temperature of the autoclave 10 is measured by a temperature sensor 60, for example, a thermocouple device. The temperature sensor 60 provides a signal proportional to the temperature to the control valve 50 for controlling the flow of heated water through the heat exchanger 40. The control valve 50 may, for example, be a Spirax/Sparco (Blythewood, SC) model 1"KE43/5223/EP5/MPC2 or other suitable control valve.

For a single autoclave, the water heater 20 has a capacity of 20 gallons of water. Including the heat exchanger, the total water volume of the described embodiment system is about 24 gallons of water. The water heater 20 includes a pressure container and multi-stage heating elements for efficient heating of the water responsive to demand. The water heater 20 is controlled to maintain the predetermined water temperature setting, and has a high temperature shutoff and includes pressure relief valves. A Caloritech Inc. (Amherst, N.Y.) model VWBF-20 water boiler or a BUDZAR (Willoughby, Ohio) model 1WT-150-DSP water boiler are examples of a suitable water heater unit. Suitable controllers for the water heater unit are available from Yokogawa, Allen Bradley, and Partlow, for example.

The pump 30 is preferably a centrifugal pump to move the heated water from the water heater 20 through the heat exchanger 40. The pump 30 operates at a constant flow in the range of 20 to 50 gallons per minute, and preferably about 25 to 35 gallons per minute, to move a sufficient quantity of heated water to meet the heating requirements of the autoclave 10. An R. S. Corcoran Co. (New Lenox, Ill.) Model 2000 D has been found to be suitable pump.

A forced air circulation system in the autoclave, for example, a fan, circulates air past the heat exchanger to facilitate heat transfer from the water to the air, and around the interior space to ensure uniformity of the temperature in the chamber. Preferably, air circulation is at a rate of at least 1000 feet per minute, more preferably, in a range of 1500 to 1800 feet per minute.

The invention provides a heated water system that is readily installed in conventional autoclaves. The system can be integrated with the existing heat exchanger and temperature sensor. The invention advantageously is less expensive and less difficult to operate than steam or oil systems.

Figure 2:
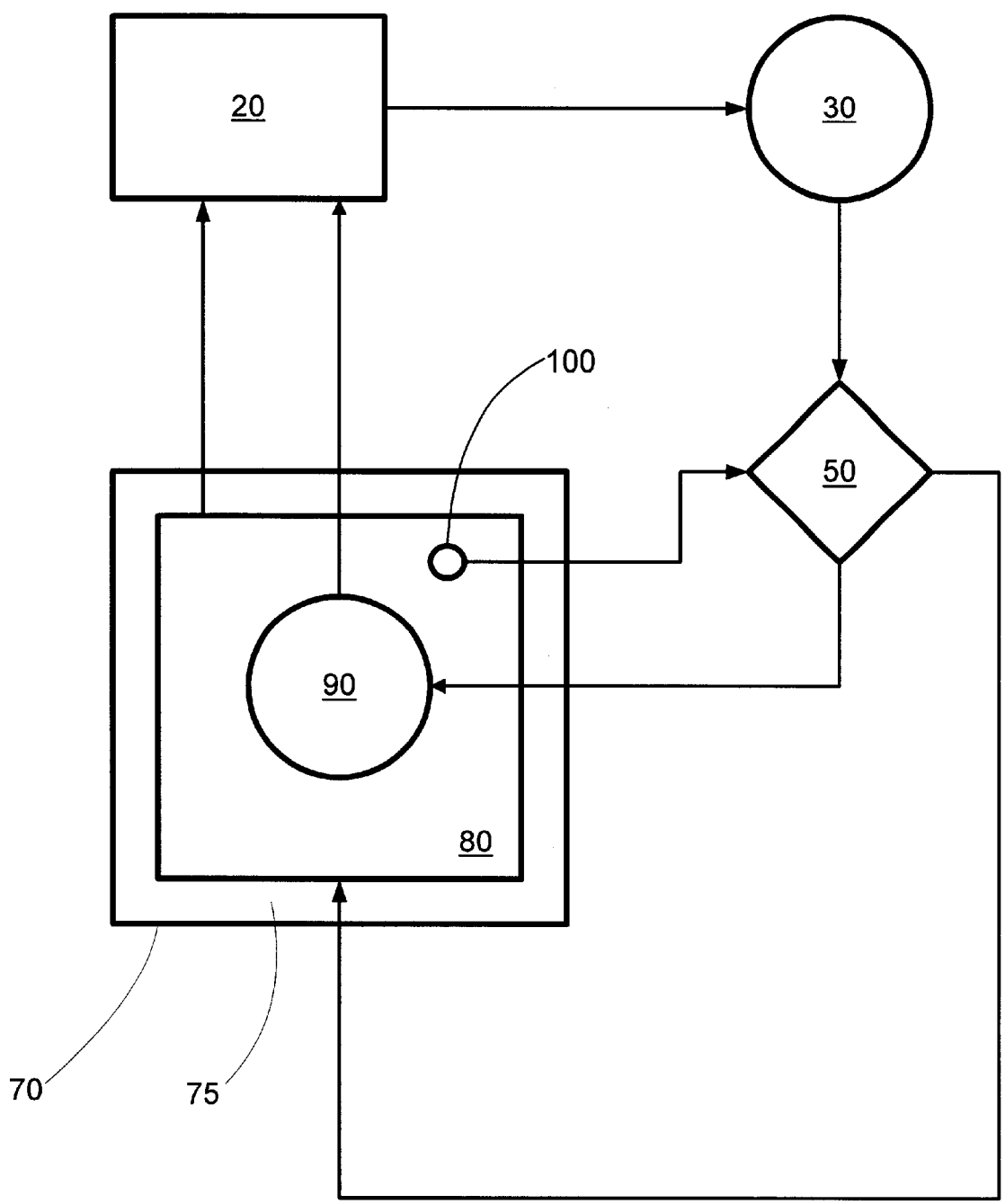
FIG. 2 is a schematic representation of an alternative embodiment of the invention.

According to an alternative embodiment illustrated in FIG. 2, the water system can be adapted for use in a curing press 70 for a so-called "hot cure" retreading operation. In hot cure, the tread rubber placed on the buffed carcass is not cured, and the curing operation both cures the tread rubber and bonds it to the carcass. The retread tire assembly is placed in a curing press 70 similar to those used for vulcanizing new tires. The curing press includes an internal cavity in which the retread tire assembly is placed. A mold tread ring 75 surrounds and is pressed into the tread rubber to form the tread pattern. The ring 75 is heated by a heat exchanger 80 in the curing press to heat and cure the rubber. A bladder 90 is disposed in the internal space defined by the tire and is inflated with a fluid to apply heat and pressure to the inner surface of the tire for shaping and curing.

According to an alternative embodiment of the invention, the water heater system 20 is connected to provide heated water to the press heat exchanger 80 and to the bladder 90. A temperature sensing device 100 senses the temperature in the press, and provides a signal to the control valve for supplying the appropriate flow of heated water. The temperature sensor 100 may comprise a plurality of sensing units disposed at suitable locations in the curing press, for example at or in the bladder and on the tread ring. The control valve 50 may comprise two control valves each dedicated to separate flows to the bladder 90 and heat exchanger 80.

The invention has been described in terms of preferred principles, structure, and embodiments. Those skilled in the art will recognized that the specific components described are for the purposes of illustration only, and equivalents may be substituted therefor without departing from the scope of the invention as defined in the claims.

I claim:

1. An apparatus for curing tires, comprising:
   a chamber for containing at least one retread tire assembly for curing;
   a heat exchanger disposed in the chamber;
   a heating unit for heating water connected to the heat exchanger in a closed circuit;
   a pump for circulating a flow of water between the heating unit and the heat exchanger; and,
   a control valve connected in the closed circuit to control the flow of water to the heat exchanger to attain and maintain a predetermined temperature in the chamber.

2. The apparatus as claimed in claim 1, further comprising sensing means for sensing a temperature in the chamber connected to the control valve, wherein, the control valve controls the flow of water responsive to a signal from the sensing means.

3. The apparatus as claimed in claim 2, wherein the heat exchanger is a multi-pass fin and tube assembly.

4. The apparatus as claimed in claim 1, wherein the chamber is an autoclave for curing a previously cured tread on a previously cured tire carcass.

5. The apparatus as claimed in claim 3, wherein the heat exchanger is a steam plate assembly.

6. The apparatus as claimed in claim 1, wherein the chamber is a tire curing press and the heat exchanger comprises a bladder disposable in an interior of a tire cavity and a circuit for guiding the flow of water through portions of the mold press surrounding an exterior of the tire.

7. The apparatus as claimed in claim 1, wherein the water heater includes a control to heat water to a temperature of at least 143° C.

8. The apparatus as claimed in claim 7, wherein the water is heated to a temperature of 155° C.

9. The apparatus as claimed in claim 1, further comprising means for circulating air in the chamber at a rate of 1500 to 1800 feet per minute.

10. The apparatus as claimed in claim 1, wherein the pump is rated to circulate heated water at a rate of 25 to 35 gallons per minute.

11. A method for curing retreaded tire assemblies having a precured tread, comprising the steps of:

placing a plurality of retreaded tire assemblies in a chamber;

heating water to a temperature of at least 143° C.;

circulating the heated water in a closed circuit through a heat exchanger in the chamber;

circulating air in the chamber to flow by the heat exchanger; and controlling the circulation of water to obtain and maintain an air temperature of at least 126° C. for a predetermined curing duration.

12. The method as claimed in claim 11, wherein the water is heated to a temperature of 155° C., and the air temperature is maintained at 137° C.

13. The method as claimed in claim 11, wherein air is circulated at a rate of at least 1000 feet per minute.

14. The method as claimed in claim 13, wherein air is circulated at a rate of 1500 to 1800 feet per minute.

15. The method as claimed in claim 11, wherein the heated water is circulated at a rate of 25 to 35 gallons per minute.

* * * * *